United States Patent [19]
Stolfo et al.

[11] Patent Number: 5,363,473
[45] Date of Patent: Nov. 8, 1994

[54] INCREMENTAL UPDATE PROCESS AND APPARATUS FOR AN INFERENCE SYSTEM

[75] Inventors: Salvatore J. Stolfo, Ridgewood; Ouri Wolfson, Paramus, both of N.J.; Hasanat Dewan, New York, N.Y.

[73] Assignee: The Trustees of Columbia University in the City of New York, New York, N.Y.

[21] Appl. No.: 706,401

[22] Filed: May 28, 1991

[51] Int. Cl.$^5$ .............................................. G06F 15/18
[52] U.S. Cl. ........................................ 395/50; 395/76
[58] Field of Search ...................... 395/50, 64, 51, 76

[56] References Cited

U.S. PATENT DOCUMENTS

| | | | |
|---|---|---|---|
| 4,837,735 | 6/1989 | Allen, Jr. et al. | 395/11 |
| 4,866,635 | 9/1989 | Kahn et al. | 364/513 |
| 4,965,882 | 10/1990 | Barabash et al. | 395/50 |
| 5,140,671 | 8/1992 | Hayes et al. | 395/76 |
| 5,197,116 | 3/1993 | Katoh et al. | 395/51 |

OTHER PUBLICATIONS

Schor et al, "Advances in Rete Pattern Matching," Proc. of 1986 American Association for Artificial Intelligence Conference, 1986, pp. 226–232.

Hillyer et al, "Execution of OPS5 Production Systems on a Massively Parallel Machine," Journal of Parallel and Distributed Computing, 3, 236–268, 1986.

Gupta et al, "Parallel OPS5 on the Encore Multimax," Proceedings of the 1988 International Conference on Parallel Processing, 1988, pp. 271–280, vol. I.

Stonebraker et al., "The Implementation of POSTGRES," IEEE Trans. Knowledge and Data Engineering, vol. 2(1), Mar. 1990, 125–142.

Sanborn, J.C., "Coping With Control in Rule-based Programs", Heuristics, Vo 3 (1), Spring 1990, 50–58.

*Primary Examiner*—Robert W. Downs
*Attorney, Agent, or Firm*—Brumbaugh, Graves, Donohue & Raymond

[57] ABSTRACT

A technique is provided in the present invention for updating a current database without restarting a knowledge-based system (rule-based system, inference system, expert system). The technique allows for the receipt of updates to an earlier database after an inference procedure has started or even after it has ended. The technique calls for the performance of actions necessary to incrementally bring the database to a consistent state by selectively undoing the inferential consequences of not having had the updated fact in the prior inference procedures and redoing the inferential consequences of having the newly received updated fact.

8 Claims, 3 Drawing Sheets

INCREMENTAL PROCESSING

1. UNDO <u>ALL AND ONLY</u> THE CONSEQUENCES OF ASSUMING
   ( LINK A_B DOWN )    IS NOT IN INITIAL DATABASE

2. DO <u>ALL AND ONLY</u> THE CONSEQUENCES OF ASSUMING
   ( LINK A_B DOWN )    IS IN INITIAL DATABASE

| STATE RECORD | |
|---|---|
| FIELD | TYPE |
| ADDED | INTEGER |
| DELETED | INTEGER |
| ITER | INTEGER |
| STATUS | BINARY |

INCREMENTAL UPDATE PROCESS AND APPARATUS FOR AN INFERENCE SYSTEM

FIELD OF USE

The present invention relates to computerized inference systems as applied to database systems.

BACKGROUND OF THE INVENTION

Inference or rule-based systems include a knowledge base (or database) which consists of a set of facts, a set of rules applicable to the facts, and an inference procedure for producing new facts by applying rules to existing facts. Thus, the database changes as a result of inference activity carried out by a rule interpreter that evaluates rules. Typically, moreover, such systems assume a static environment in the sense that changes to the database take place only as a result of rule-program evaluation, so that any change in the initial database requires restarting the system. These systems are not capable of efficiently incorporating modifications to the database of facts resulting from sources other than the actions of the rules themselves.

SUMMARY OF THE INVENTION

In the interest of enhanced efficiency of a computerized inference system, the invention provides for updating a current database without restarting the system. Rather, changes are made directly in a current database to reflect a change in the original database from which the current database was produced.

DETAILED DESCRIPTION

In real time applications, e.g., communication network management, the database may change independently of the inference process, since usually one cannot afford the luxury of collecting all the relevant facts before starting the inference procedure. Relevant information may arrive after inferencing has already begun. Consider, for example, an expert analyzer for automatically detecting a fault in a communication network that is in operation, and which is continuously producing information relevant to the detection process. In this environment, messages may arrive from time to time that nullify previous assumptions. For example, suppose the expert analyzer has assumed that some link LINK A_B is up when the diagnosis of some problem was started, and at some later point, say at iteration n of the standard match-select-act cycle, a message arrives indicating that LINK A_B is down. The naive approach for incorporating this late arriving information would be to restart the expert analysis from the beginning. However, considering that network management data is being produced continuously, this strategy may result in an infinite regression and the inference process may never terminate.

In prior art truth maintenance systems designed for incremental evaluation, such as Jon Doyle's "A Truth Maintenance System; Readings in Artificial Intelligence", Morgan Kaufmann 1981, pp. 496-516; A. Barr and E. Feigenbaum, eds., "The Handbook of Artificial Intelligence", Vol 2; Raymond Reiter and Johan de Kleer, "Foundations of Assumption-Based Truth Maintenance Systems", Preliminary Report, Proceedings of AAAI-87, pp. 183-188; and K. R. Apt and J. Pugin: "Maintenance of Stratified Databases Viewed as a Belief Revision System", Proc. 6th ACM Symp. on PODS pp. 136-145 (1987), the systems employed a truth maintenance system which built a dependency graph having nodes that correspond to base and derived facts. A problem with these systems is that in data intensive applications, space requirements for maintaining such dependency graphs become prohibitively expensive. This problem is further exaggerated by the fact that the dependency graph in such systems requires the representation of negative facts in the database in order to support the graph.

Closely tied to the question of incremental updates to a database is the semantics of the underlying rule language. For DATALOG programs, where negation is not allowed in either the head or body of a rule, incremental processing is simple. Consider for example the semi-naive evaluation of the linear DATALOG program that computes the transitive closure of a graph as described in J. D. Ullman's "Principles of Database and Knowledge Base Systems", Computer Science Press, 1989. Incorporation of a newly arrived arc of the graph is easy. The arc is simply added to the differential, and the evaluation proceeds as usual, until a fixpoint is reached. This can be done regardless of whether the new arc arrived before or after the transitive closure evaluation has completed. Since DATALOG is strictly monotonic, incremental update involves only recomputing the consequences of the newly arrived arc.

On the other hand, retraction of an arc from the graph, even in the simple transitive closure example, is a more subtle non-monotonic process. Consider languages that allow negation in the body and head of rules (negation in the head means deletion). Suppose that the fact f is retracted from a database after some inferences that depend on f have occurred. The high level view of subsequent processing that must take place is the following: the facts that were derived from f (and recursively, their derivatives) must be backed out or undone, and then the facts that can be derived from $-f$ (and their derivatives) must be redone. For DATALOG programs (that do not have negative atoms in the rules), no actions are derived from negative facts. Therefore, for a retracted fact we only need an undo phase, and for an asserted fact we only need a redo phase. However, for more powerful rule languages, we need both an undo and a redo phase to incrementally update the database.

These two phases are not always straightforward. Rule languages such as OPS5 and DATALOG¬* usually operate in match-select-act cycles, and at each cycle (or iteration), some conflict resolution strategy is applied (note: in DATALOG, the symbol ¬ indicates that negations are allowed in bodies and the symbol * indicates that negations are allowed in the heads. A more detailed explanation of the DATALOG¬* language is described infra.) Now, consider redoing the consequences of f for the above example, This involves matching all the rules (or some sub-set of them in a language such as STRATIFIED DATALOG) and considering the instantiations that have f in the body. Suppose that the head of such an instantiation is add_e. This does not mean that we can simply add e to the database during the redo phase for the following reason. The incremental procedure must produce the same result as if f were in the initial database. If f were in the initial database, it is possible that the add_e operation would have been eliminated by a conflict resolution strategy within the language procedure. In the language DATALOG, add_e would have been cancelled out by a delete_e operation in the same cycle; moreover, the delete_e operation may not be a consequence of f. Similarly, in OPS5 add_e would not have been executed had there been a more recent instantiation in the cycle. Therefore, the incremental procedure must have enough information to determine for each redo instantiation whether or not it would have been eliminated by the conflict resolution strategy. Furthermore, this information obviously depends on the conflict resolution strategy, which in turn depends on the rule language.

Now consider the data reduction paradigm for distributed and parallel rule processing, as described in S. J. Stolfo, D. P. Miranker and R. Mills, "A Simple Processing Scheme to Extract and Load Balance Implicit Parallelism in the Concurrent Match of Production Rules", Proceedings of the A.F.I.P.S. Symp. on Fifth Generation Computing, AFIPS, 1985. It stipulates that each processor evaluates the original rule program, but with less data. The operations of each processor that result from the evaluation (e.g. add-a-fact or delete-a-fact) are transmitted to other processors that may use these to derive other operations. Now, if the processors are synchronized at each cycle, meaning that they all complete their evaluation and transmission in a certain cycle before any processor proceeds to the next one, then incremental evaluation is not necessary. However, this implies that the evaluation proceeds at the speed of the slowest processor at each iteration, which is not acceptable in a distributed setting. Suppose therefore that the evaluation proceeds asynchronously. Then it is possible that a processor $p_1$ that is evaluating at cycle 5 receives an add_e from a processor $p_2$ that is evaluating at cycle 3. This means that $p_1$ has to incorporate e into its local database of cycle 3. Then the problem it faces is exactly the problem of incremental rule processing: it has to undo the consequences of −e at cycle 3, and redo the consequences of e at cycle 3, but without backing its whole rule evaluation to cycle 3. In other words, individual processors need to have the ability to incorporate changes from other processors in arbitrary previous iterations. In contrast, for real time rule processing the update is always to the input database, namely to cycle 0.

The present invention provides a method and apparatus for performing only those actions in an inference mechanism that are necessary to incrementally bring the database to a consistent state.

The present invention also provides a method and apparatus where incremental updating may be performed in a recursive manner in which it can operate for an arbitrary cycle update such that it may be applied to asynchronous parallel-and-distributed rule processing by data reduction.

The technique herein described for incrementally updating a database can be summarized as follows. In the context of the previous example, wherein it was initially assumed that link LINK A_B was up and, subsequent to commencing inferential processing, a message arrived indicating link LINK A_B was down, a system employing the present technique would only undo the consequences of the initial assumption that LINK A_B was up, and redo the consequences of the newly received fact that LINK A_B is down. In other words, only the consequences associated with the newly arrived information would be revised.

Figure 1:
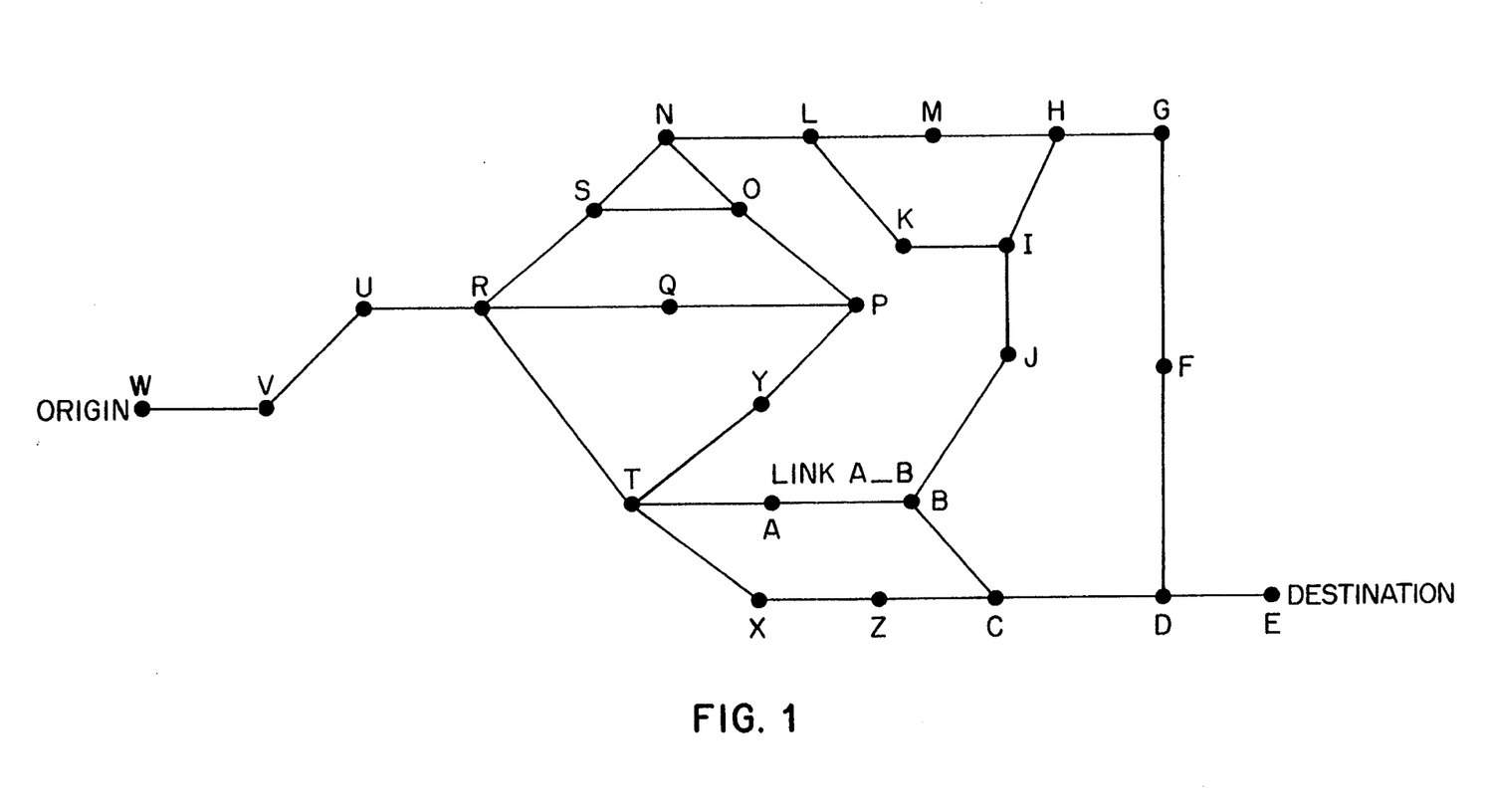
FIG. 1 is a schematic representation of a communication network whose operation may involve use of a preferred method and system in accordance with the invention.
Figure 2:
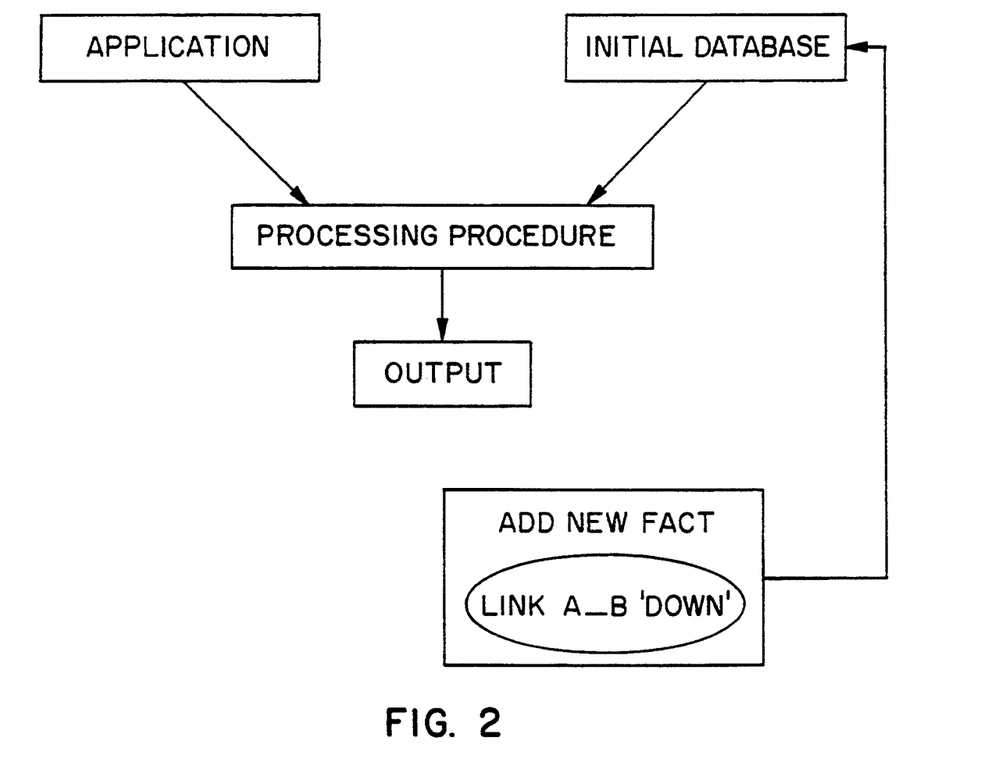
FIG. 2 is a block diagram of a method in accordance with a preferred embodiment of the invention.
Figure 3:
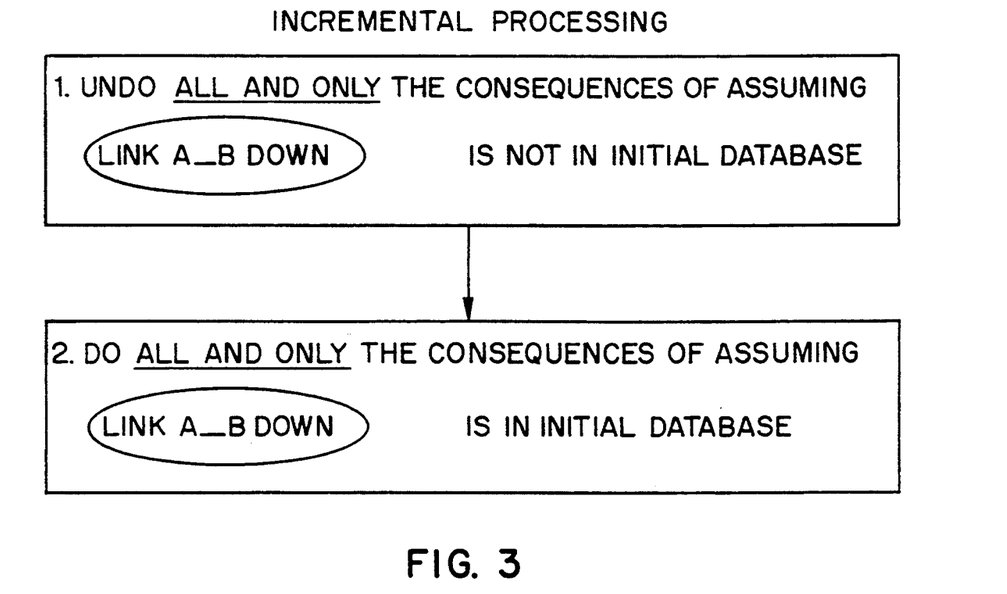
FIG. 3 is a block diagram of updating in accordance with a preferred embodiment of the invention.

This simplified example is functionally illustrated in FIGS. 1-3. In FIG. 1, LINK A_B represents the connection between two communication nodes, node A and node B in a communication system. In this example, the goal is to establish a communication line from our point of origin, namely node W, to our destination, node E. The nodes are connected by a series of links which can either be up, useable for connection from an initial node to a destination node, or they can be down, wherein no connection can be made between the nodes. A connection can only be made by connecting enough continuous links to directly connect the point of origin to the point of destination under constraints developed in the inference program. In real life applications, constraints may include the selection of links which have less traffic; however, in this example we will simply choose the selection of the minimum number of links to connect any two points. If we commence with the assumption that LINK A_B is up and the system's inferential process causes a connection through LINK A_B, the consequences of having LINK A_B go down would be catastrophic to the system's goal. Simply stated, the system will have established a faulty connection. Thus, if a processing system received a message adding the new fact that link LINK A_B was down to the initial database, as illustrated in FIG. 2, the system would need to address the new fact. In the system of the present invention, rather than restart the inference process from the beginning, the system would only undo the consequences of LINK A_B being up, then these LINKS would be disengaged, and the system would redo the consequences of LINK A_B being down, as asserted in FIG. 3. In other words, the system would find another route for connecting nodes W and E under the prescribed constraints of the program without starting over. For instance, the system would disengage LINK A_B, LINK T_A and LINK B_C; engage LINK T_X, LINK X_Z and LINK Z_C; and maintain the other previous links, namely LINK W_V, LINK V_U, LINK U_R, LINK R_T, LINK C_D, and LINK D_E.

In another example using FIG. 1, if the inference system had previously established that a connection could be made from nodes W to E by passing through nodes T and C, and that nodes T and C could be connected by either routes T_A_B_C or T_X_Z_C, then a subsequent update message indicating LINK A_B to be down would require the system to backtrack only up to the point where it was inferenced that nodes T and C could be connected through one of two paths. Because it had been previously inferenced that nodes T and C would be connected via path T_X_Z_C, the system would trace only need to undo the inference that LINK A_B was up and that path T_A_B_C could be used as a path between nodes T and C. Thus by starting the undo consequences at the inference iteration using the fact LINK A—B to be up and by simply undoing those consequences, the system would trace back to the inference finding another alternative node path, namely, LINK T—X, LINK X—Z and LINK Z—C, to exist. The redo step would simply reassert the consequence of eliminating the alternate path from nodes T to C using LINK A—B is a useable path. Thus by concentrating the analysis on the immediate consequences of LINK A—B being down and using previously asserted consequences that are not affected by LINK A—B being down, namely that nodes T—C could be connected through an alternative path, the system can be more efficiently operated than if the system would have to be started anew or if some complex tree structure had to be retraced or recalculated.

A more detailed explanation of the present invention will be provided in the context of the language DATALOG¬*, wherein an application of the present invention is provided. The reason for choosing this language is that it has several attractive characteristics. First, it is set-oriented, a typical feature of database rule languages. Second, it is sufficiently rich, allowing negation in the body and in the head of rules. Third, it is abstract enough to enable identifying principal concepts that relate to incremental evaluation of rules, independently of the idiosyncrasies of commercial languages.

The Language DATALOG¬*

In this section, the basic terminology for DATALOG¬* is introduced. Intuitively, rules in DATALOG¬* have the general form:

$$\pm h(\ldots):-\pm b_1(\ldots),\ldots,\pm b_K(\ldots),\ldots \pm b_n(\ldots)$$

A positive head implies the corresponding fact should be added to the database on rule firing, whereas a negative head implies the corresponding fact should be removed from the database, if it exists.

Formally, DATALOG¬* programs are built from atoms, which are predicate symbols followed by a list of arguments. The arguments may be either variables or constants. For simplicity, constants are natural numbers. A literal is either an atom, also called a positive literal, or a negated atom, also called a negative literal. If all arguments are constants, we call the literal a fact. A rule consists of a literal, the head of the rule, and possibly a conjunction of positive and negative literals which form the body of the rule. Variables are denoted by capital letters, and predicate names are strings built from lower case letters. An example of a rule is $$a(X,Y):-a(X,Z),p(Z,Y),\neg q(Z,2)$$

where the head of the rule is always to the left of :—, and the body to the right. If Q is a set of facts, then ¬Q denotes the set having the same literals as Q, but with their sign reversed.

A program is a set of rules. A program is called safe if each rule fulfills the following conditions:
  (1) Each variable in the head of the rule also occurs in the body of the rule, and (2) Each variable in a negative literal in the body also occurs in a positive literal of the body. We require that programs be safe.

The instantiation of a rule r is defined with respect to a database, i.e. a finite set of positive facts; it is an assignment of constants to the variables in r such that all the positive facts in the body are in the database, and the negative ones are not.

The operational semantics of the evaluation are as follows. The input to a program is a database. The output of a program P for an input I, denoted O(P,I), is the database obtained at the end of the following iterative procedure.

Procedure DATALOG¬*_SEMANTICS
  1. Start with the database consisting of the input. Initialize the evaluation iteration count IC ← 0.
  2. (Match) Determine S, the set of operations each of which is the head of an instantiation with respect to the current database. If this set is empty, stop.
  3. (Select) Let S' be the subset of S consisting of all the operations whose negation is not in S (i.e., if f and ¬f are both in S then neither operation is in S').
  4. (Act) Execute the operations in S'. Increment IC by 1. Return to 2.
  end {procedure DATALOG¬*_SEMANTICS}
Notice that the Select step indicates that if a fact f is added and deleted at the same iteration, regardless of the number of occurrences of these operations, the status of f (In or Out of the database) remains as it was in the previous iteration.

Incremental Evaluation Update Procedure

Basically, the inference procedure of the present invention consists of two phases: DO and INCR_UPDATE. The DO phase consists of the procedure DATALOG¬*_SEMANTICS of the previous section. After the Act step, there is a check to determine whether an interrupt message has been received. If so, the INCR_UPDATE procedure is invoked. The incremental evaluation update stage consists of an UNDO phase and a REDO phase. The interrupt message consists of a set Q, of positive and negative facts, denoting additions and deletions, respectively, to be applied to the input database.

Consider the DO phase. With each fact f that was in the database at some iteration, we associate a fact chain that enables us to determine the status (in or out of the database) of f at each iteration. The structure of the fact chains will be described infra.

Suppose that the positive fact f is in Q, and f was not in the input database. Then we first execute the match step of the inference procedure, considering only instantiations with respect to the input database in which ¬f appears in the body of the instantiated rule. This is the UNDO phase. Let U be the set of operations in the heads of these instantiations. Each operation in U will have to be undone. Second, we execute the match step of the inference procedure, considering only instantiations with respect to the input database, in which f appears in the body of the instantiated rule. This is the REDO phase. Let R be the set of operations in the heads of these instantiations. Each operation in R will have to be redone.

Now suppose that +e (or simply, e) is in R, indicating that the fact e would have been added to the database in the first cycle, had f been in the input database. This does not necessarily mean that the incremental procedure should repeat the redo phase with e. It is possible that in the first cycle e was added to the database not only as a result of the instantiation that has f in the body, but also as a result of another instantiation. Then e is not new in the second iteration, and it should be eliminated from the incremental evaluation of the subsequent cycles. In other words, based on the sets U and R we should determine which facts are new. Only they should be carried forward, to the next cycle in the incremental evaluation.

Generally speaking, given UNDO and REDO sets, the incremental procedure, call INCR_UPDATE, determines which facts must be viewed as having changed their status as a result of the incremental procedure at the specified iteration. The set of facts that are determined to have changed their status is called the NEW set. This set is the focus of interest of procedure INCR_UPDATE. The procedure recursively redoes all the inferences that descend from the NEW set, and it also recursively undoes the inferences that stem from NEW. In other words, UNDO and REDO sets are generated for successive iterations, given the initial ones. Formally, procedure INCR_UPDATE is as follows.

recursive procedure INCR_UPDATE (U,R,i)

Comment: This procedure is invoked by the inference system, as an exception handler on receiving incremental modifications to past assumptions made on the database. The procedure modifies the database, given two sets of operations, U and R, that have to be incorporated at some past evaluation iteration i. Each set contains positive and negative facts. The set U represents a collection of facts whose addition or deletion (depending on the sign) has to be undone at iteration i. It is called the undo set. The set R represents a collection of facts whose addition or deletion has to be incorporated at iteration i. It is called the redo set.

1. $\eta$ - Current Evaluation Iteration Number in the DO Phase.
2. If (i = $\eta$) RETURN to the DO Phase.
3. For each $f_u \in U$
    call UNDO_MAINTAIN_CHAIN($f_u$, i)
    Comment: undoing an operation amounts to the manipulation of the corresponding fact chain.
4. For each $f_r \in R$
    call REDO_MAINTAIN_CHAIN($f_r$, i)
    Comment: redoing an operation amounts to the manipulation of the corresponding fact chain.
5. NEW←COMPUTE_NEW(i)
    Comment: the NEW set is computed by examining the fact chains.
6. If (NEW = $\phi$) RETURN to the DO Phase.
7. Find all rule instantiations with respect to the database at iteration i, such that a fact $f_r \in$ NEW is in the body. Denote $F_r$ the set of facts in the heads of these instantiations. This will serve as the redo set for the recursive call.
8. Find all rule instantiations with respect to the database at iteration i, such that a fact $f_u \in \neg$NEW is in the body. Denote $F_u$ the set of facts in the heads of these instantiations. This will serve as the undo set for the recursive call.
9. Call INCR_UPDATE($F_u,F_r$, i + 1).
    end {procedure INCR_UPDATE}

The initial invocation is INCR_UPDATE($\phi$,Q,0), where Q is the set of facts in the interrupt message.

The computations in steps (7) and (8) of the above recursive procedure is clearly less expensive, in general, than computing all instantiations of rules at iteration i.

In order to demonstrate the correctness of the INCR_UPDATE procedure, we need to show that if an incremental update message to incorporate a positive or negative fact f in the input database is received while the processor is at iteration t>0, then the final database produced would be the same as in the case where f is in the input database.

FACT CHAINS

As mentioned earlier, for each fact f there is a chain C(f) that enables the system to determine the status of f at each iteration. For each iteration in which f was added or deleted (either in the DO or the REDO phases) we keep a count of the number of times it was added, and the number of times it was deleted. In other words, for each iteration we keep a state record in C(f), which has the structure illustrated in FIG. 4.

Fact chains are different fundamentally than timestamps, typically used in concurrent data base update applications. Fact chains determine the status of facts in or out of the database for each iteration of an iterative inferential process. Timestamps, see Ullman, are used to label individual transactions with a unique time that a transaction was initiated. Timestamps are thus used to ensure concurrency control of multiple concurrent updates to a database. It is assured that no two transactions have the same timestamp thus ensuring that multiple transactions are performed in a serial order. Fact chains, on the other hand, are associated with the data records in the database, not the transactions performed against the data, and indicate the status of a fact at some inference iteration cycle.

Figure 4:
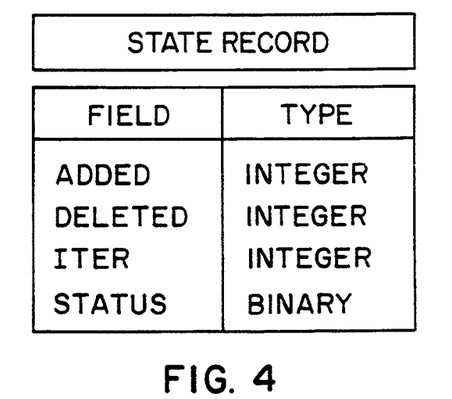
FIG. 4 is a schematic representation of a status record as may be used in a preferred embodiment of the invention.

In FIG. 4, the Iter field indicates which iteration a particular state record corresponds to, and the Status field holds the status of the fact (In or Out of the database) at that iteration. The Added and Deleted fields are necessary to count the number of occurrences of additions and deletions (even though the operational semantics do not require so), since one does not know how many of these operations will be undone in the future.

INITIALIZATION AND MAINTENANCE OF THE FACT CHAINS

Each fact present in the initial input database is called an initial fact. We set up fact chains for the initial facts at startup time. All such facts have fact chains initialized with a single state record s, with s.Iter set to 0, and s.Status set to In. Additional chains are established for those facts which are added or deleted during inference, and for which no chain was established initially. Chains established during inference consist of a state record at iteration 0 with a status of Out, and a state record for iteration t, where t is the iteration when f was added or deleted during the inference process.

Maintenance operations on chains occur in all phases of incremental evaluation. DO and REDO phases increment the count in the Added or Deleted fields of the state record, depending on whether the fact in question is added or deleted as a result of rule firing (note that facts are never physically deleted, only their delete count is incremented). In contrast, UNDO decrements the appropriate field. The procedure that manipulates the chains during DO and REDO phases is REDO_MAINTAIN_CHAIN. Procedure UNDO_MAINTAIN_CHAIN manipulates chains during the UNDO phase. REDO_MAINTAIN_CHAIN receives a set of facts and an iteration number, and increments the counts of the appropriate fields of the state record indicated by the iteration number, whereas UNDO_MAINTAIN_CHAIN decrements the counts. As an example, consider the effect of the procedure call UNDO_MAINTAIN_CHAIN({$f_1$, $\neg f_2$}, i).

Suppose C(f₁) has a state record u with u.Iter=i,
u.Added = 1 and u.Deleted = 1, and C(f₂) has a state record
v with v.Iter=i, v.Added = 0 and v.Deleted = 1. After the
procedure executes, we will have u.Added = 0, u.Deleted = 1,
v.Added = 0, v.Deleted = 0. Subsequent to this, if we make
the call
        REDO_MAINTAIN_CHAIN({ f₁, f₂}, i)
we will end up with u.Added = 0, u.Deleted = 2, v.Added = 1,
v.Deleted = 0.

COMPUTING THE NEW SET

The status of a fact f for any iteration is determined by examining the Added and Deleted fields in the state record for that iteration. This applies to the DO phase and to the incremental update phase as well. In procedure INCR_UPDATE, the final value of the status of a fact f and the set of new facts at an iteration is computed with the COMPUTE_NEW function.

COMPUTE_NEW takes an evaluation iteration number i as argument, and scans the chains for the facts that were changed during the UNDO or REDO phases. If both the Added and Deleted fields are zero in the state record for i, or if both are non-zero, then we revert to the status at iteration i—1. Otherwise, if the Deleted field is 0, we interpret that as indicating that the fact was only added, and the status is set to In, whereas if the Added field is 0, the status is set to Out. A fact is flagged new if its newly computed status is the inverse of its former status. The outline of procedures INITIALIZE_CHAINS, UNDO_MAINTAIN_CHAIN, REDO_MAINTAIN_CHAIN, and COMPUTE_NEW are shown below.

---

PSEUDOCODE FOR MAINTENANCE
OF FACT CHAINS

```
procedure INITIALIZE_CHAINS
DB ← Global Database
For Each F ∈ DB do
    Create a new chain C(F) indexed by F.
    Link a state record s to C(F). Set the fields of s as
    follows:
        s.Added ← 1
        s.Deleted ← 0
        s.Iter ← 0
        s.Status ← In
end {procedure INITIALIZE_CHAINS}
procedure REDO_MAINTAIN_CHAIN(f,i)
F ← |f|
DB ← Global Database
If C(F) exists
    If ( s ∈ C(F) such that s.Iter = i, then
        if f is positive, set s.Added ← s.Added + 1
        else if f is negative, set s.Deleted ← s.Deleted + 1
    Else
        Insert a new state record p at the correct position in
            the chain.
        p.Iter ← i
        if f is positive, set p.Added ← 1,p.Deleted ← 0
        else p.Deleted ← 1, p.Added ← 0.
Else if there is no C(F) then
    Create C(F). Link initial record s to it.
    Set s.Added, s.Deleted, s.Iter fields to 0, and s.Status
        to Out.
    Add a record to the end of the chain, or overwrite the
        initial record if i = 0. Call this record p.
    Set p.Iter ← i
    If f is positive then p.Added ← 1, p.Deleted ← 0,
        DB ← DB ∪ {f}
    else if f is negative than p.Added ← 0, p.Deleted ← 1
end {procedure REDO_MAINTAIN_CHAIN}
procedure UNDO_MAINTAIN_CHAIN (f,i)
F ← |f|
Find the state record s in C(F) with s.Iter = i
    Comment: cancel adds or deletes from some previous
```

---

PSEUDOCODE FOR MAINTENANCE
OF FACT CHAINS

```
        iteration.
    If f is positive then s.Added ← s.Added − 1
        else s.Deleted ← s.Deleted − 1
end {procedure UNDO_MAINTAIN_CHAIN}
function COMPUTE_NEW(i)
NewSet ← φ
For each fact chain that has been updated
    Find the state record s at iteration i if it exists
        if ((s.Added = 0) ∧ (s.Deleted = 0)) then
            s.Status ← Status at (i − 1)
        else if ((s.Added ≠ 0) ∧ (s.Deleted ≠ 0)) then
            s.Status ← Status at (i − 1)
        else if (s.Deleted = 0) then
            s.Status ← In
        else if (s.Added = 0) then
            s.Status ← Out
        If the new status represents an inversion, then
            f ← Fact under consideration, with sign.
            NewSet ← NewSet ∪ {f}
    RETURN (NewSet)
end {functionCOMPUTE_NEW}
```

APPLICABILITY OF INCR_UPDATE TO STRATIFIED DATALOG¬

For stratified DATALOG, the rule program interpreter evaluates the rules one stratum at a time. (For a general discussion relating to stratified DATALOG See Ullman, supra). Iteration numbers are then replaced by the pair (Stratum_Number, Iter_Number), which may be regarded as our new iteration counter. This adaptation of this implementation calls for the adoption of a modified numbering scheme for chain maintenance operations, and for matching rules in steps (7) and (8) of procedure INCR_UPDATE. First, instead of ordering the fact chains by iteration number, we now use the order imposed by lexicographic ordering of the (Stratum_Number, Iter_Number) pairs. Therefore, in the incremental update phase, instead of referring to iteration i—1, we refer to the previous iteration in the lexicographic order. Second, in steps (7) and (8) of procedure INCR_UPDATE, we restrict the matches to rules in the particular stratum being considered. With these simple modifications, INCR_UPDATE is applicable to stratified DATALOG.

DISTRIBUTED SYNCHRONOUS EVALUATION OF DATALOG¬* PROGRAMS

In a data reduction paradigm for DATALOG (without negation), instantiations of the rules in a given program are partitioned among a set of processors. The original program is evaluated on each processor, but with less data. The partition of the instantiations is achieved by restricted versions of the original program, such that each restricted version is evaluated at one processor. In general, it is necessary for the processors to communicate intermediate results to each other by message passing. This paradigm is extended to DATALOG¬*. In particular, we discuss a synchronous variation of this extension, whereas in the next section, we discuss an asynchronous one.

Formally, let $P = \{r_1, \ldots r_m\}$ be a program with m rules and $\{P_0, \ldots, P_{k-1}\}$ be a set of $k > 1$ processors. For each rule $r_i$, we designate k restricting predicates, $h_{ij}(X_1, \ldots X_{qi})$, for $0 \leq j \leq k-1$. The arguments $X_1 \ldots, X_{qi}$ are the same for all the k predicates, and by definition, all the arguments are variables of $r_i$. We require that for each instantiation of the variables $X_1, \ldots, X_{qi}$, the predicate $h_{ij}$ is true for exactly one j. Denote by $r_{ij}$ the restricted version of the rule $r_i$ having the restricting predicate $h_{ij}(X_1, \ldots, X_{qi})$ appended to its body. Denote by $p_j$ the restricted version of P consisting of the set of rules $\{r_{ij} | 1 \leq i \leq m\}$. The set $\{P_0, \ldots, P_{k-1}\}$ is called a data reduction parallelization strategy for P.

The set of processors $\{P_0, \ldots, P_{k-1}\}$ cooperate in evaluating P in parallel as follows. The database is partitioned among the processors such that each tuple has a unique Data Handler processor (DH) at which it resides. The DH processor for each tuple is computed by a hash function associated with the relation. For example, the tuple a(X,Y) such that h(X)=i resides at processor i.

In the course of the evaluation, a tuple may be added and deleted by multiple processors. In databases, concurrency control is concerned with guaranteeing that the result of all transactions is equivalent to some serial execution of those transactions. In our case, we can view the $p_i$'s as executing separate transactions, where a transaction consists of the actions executed by $P_i$ at a given iteration. However, it is not enough to provide standard concurrency control on accesses to the distributed database, as some serial executions may not be acceptable according to the semantics. It becomes necessary to provide some means to act as an arbiter over database adds and deletes. This is realized by the Data Handler for each tuple. One can think of a data handler as a monitor program that runs on each processor that stores tuples and sequentially services requests for tuples by other processors. The data handlers are responsible for realizing the correct semantics with respect to database updates, as will be demonstrated below. For this variation, fact chains are not necessary.

Restricted versions of the rules are distributed to the processors, as described earlier. These are called the Rule Handlers (RH) for program P. When a rule handler requires a fact for matching, it requests it from the appropriate data handler. Determining the appropriate data handler involves a trivial evaluation of the associated hash function.

Each processor $P_i$ performs the instantiations of $P_i$ as in the normal evaluation procedure. Any newly inferred facts are transmitted to the appropriate data handlers for storage. All processors execute in step with respect to the evaluation iteration number, i.e., all processors have the same iteration number, which is used for synchronization. The following procedure is executed by Rule Handler i at iteration j, in the synchronous variation of the data reduction paradigm.

--- procedure SYNC_DATA_REDUCTION
At iteration j do:
1. Request facts from appropriate Data Handlers for the rule instantiations of $p_i$ with
    respect to the database at iteration j.
2. Add or delete tuples, as indicated by these instantiations. This is done by
    transmitting the operations (i.e. additions or deletions of facts) to the appropriate Data Handlers.
3. When all the rule and data handlers have completed iteration j (as determined by some
    distributed termination procedure, e.g. as described in K. M. Chandy and J. Misra; "On Proofs of Distributed Algorithms with Applications to the Problem of Termination Detection"; Manuscript, Dept. of Computer Science, University of Texas, Austin; and N. Francez; "Distributed Termination"; ACM Transactions on Programming Languages and Systems, Vol. 2, No. 1, pp. 42-55, 1980.
    $p_i$ moves to the next iteration.
Data Handlers do the following sequence of steps:

---continued

1. Receive all the messages from the rule handlers, indicating the operations at
    iteration j.
2. Update local database as follows:
   - If for a fact f, an add and a delete operation is received (possibly from different rule handlers) the status f at iteration j + 1 remains the same as the status of f at iteration j. This is obviously also the case if no operation on f is received.
   - Otherwise, if only adds (deletes) are received, f is added to (deleted from) the database.
end procedure {SYNC_DATA_REDUCTION}

---

Increased efficiency is implied by the fact that $p_i$ evaluates a restricted version, meaning it does fewer instantiations compared to the case where the original program P is evaluated.

DISTRIBUTED ASYNCHRONOUS EVALUATION OF DATALOG$^{\neg *}$ PROGRAMS

A major problem with the procedure described above is that no processor can proceed faster than the slowest one at each iteration. Obviously, we desire asynchronous operation of each $P_i$, but this gives rise to other problems which motivate the use of the INCR_UPDATE procedure.

Suppose some processor $P_i$ deletes a fact f at iteration $t_1$, which was used earlier by processor $p_j$. Suppose also that $p_j$ is now at iteration $t_2$, and $t_2 > t_1$. Unless handled properly, this situation may cause the operational semantics of DATALOG$^{\neg *}$ to be violated.

Recall that INCR_UPDATE allows the incremental incorporation at iteration $t_2$, database changes occurring at iteration $t_1 < t_2$. The message indicating deletion of f by $P_i$ in the example above can be viewed as an interrupt message. Thus, by using the procedure INCR_UPDATE, $p_j$ can update its database to a consistent state.

We outline below the asynchronous variation of the data reduction paradigm (henceforth called ASYNC_DATA_REDUCTION) for parallel and distributed evaluation of DATALOG$^{\neg *}$ programs. As before, we have rule handlers that own restricted versions of the rules of the original program. Furthermore, when the database is partitioned among the processors, each data handler maintains a chain for each fact. The processors operate asynchronously and each rule handler keeps its own iteration count.

More precisely, in ASYNC_DATA_REDUCTION each rule handler, $RH_i$, executes steps (1) and (2) as in SYNC_DATA_REDUCTION, at each iteration j. At step (3), instead of synchronizing, $RH_i$ checks whether or not it received an interrupt message from a data handler; such a message contains a set of NEW (positive and negative) facts at an iteration number. If this is not the case, $RH_i$ simply proceeds to the next iteration. If the message pertains to an iteration number higher than j, it is ignored and $RH_i$ proceeds to the next iteration.

Otherwise, $RH_i$ executes steps (7) and (8) of INCR_UPDATE for each interrupt message, in increasing iteration number order (meaning that it will not process a NEW set for iteration 500 if a NEW set for iteration 400 is in the queue). $RH_i$ sends the resulting UNDO and REDO sets to the data handlers (note that each set will be partitioned, with each partition being sent to a different data handler). After processing all interrupt messages $RH_i$ proceeds to iteration j+1.

Figure 5:
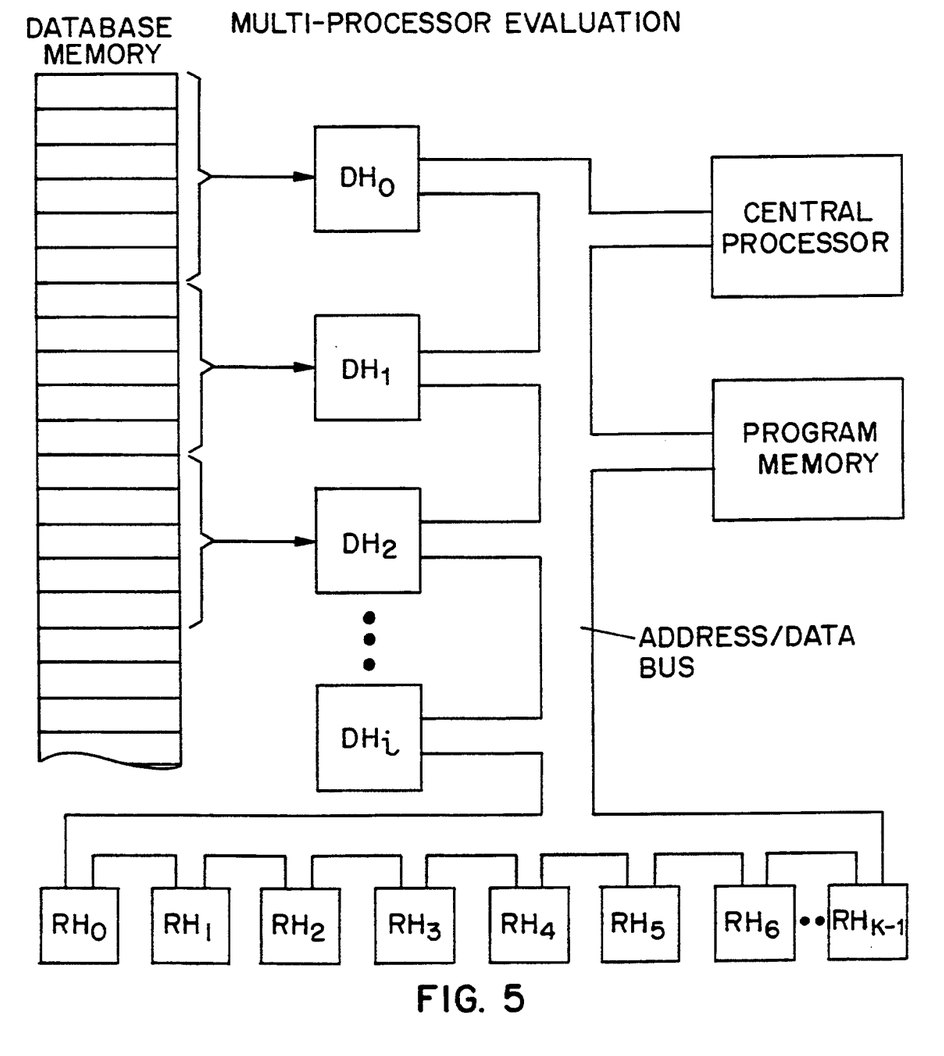
FIG. 5 is a schematic diagram of a system in accordance with a preferred embodiment of the invention.

Each $DH_i$ continuously receives REDO and UNDO sets, each associated with an iteration number. $DH_i$ processes these in increasing iteration number order. For each UNDO (REDO) set associated with an iteration, say k, $DH_i$ performs UNDO_MAINTAIN_CHAIN (REDO_MAINTAIN_CHAIN), and COMPUTE_NEW. The resulting NEW set and the iteration number k are broadcast to the RH's. If both an undo and a redo set exist for k, the UNDO_MAINTAIN_CHAIN and REDO_MAINTAIN_CHAIN will both be performed before COMPUTE_NEW. A possible implementation for the above system is shown in FIG. 5.

It should be clear that many optimizations of the transmission sets are possible, as discussed in O. Wolfson and A. Ozeri; "A New Paradigm for Parallel and Distributed Rule-Processing"; Proceedings of the ACM-SIGMOD 1990. International Conference on Management of Data, Atlantic City, N.J., May 1990.

The procedures described herein can be used for two seemingly unrelated purposes: first, to maintain the inference database in an incremental fashion in a dynamic environment where the input may be updated after inferencing is under way, and second, for the asynchronous version of the data reduction paradigm.

The INCR_UPDATE procedure can be implemented in a communication network management system and other systems in which incremental update capabilities are necessary in a real time environment.

USE OF CONFLICT RESOLUTION META REDACTION RULES

The incremental update processing procedure herein described may also be effectively used in combination with meta-level conflict resolution rules, referred to as Meta Redaction Rules. These rules regard the set of instantiations at each cycle as working memory, and remove from the set of instantiations those members that are considered to be conflicting instantiations according to these rules. After redaction of the conflicting instantiations, all the remaining instantiations in the conflict set can be fired in parallel. The meta-redaction rules seek to prevent conflicts which may subsequently develop and enhance the operation of any system by avoiding future conflicts in the instructions resulting in subsequent rule firings. Thus, the meta redaction rule may be defined to provide a means to check for conflicts between multiple instantiations of the same rule in a parallel application.

An example of the syntax defining a meta redaction rule is as follows:

---
(m <meta-rule-name>
    (<conflicting-instance-1>)
    (<conflicting-instance-n>)
    {<arith-preds>}
→
    (redact
        <redaction-instance-1>
        ...
        <redaction-instance-m>))
---

In the above example, the LHS of a redaction rule consists of the symbol m, followed by the meta-rule name, followed by specifications of rule instances in the conflict set and an arbitrary arithmetic predicate applied to variables bound in the specification of the instances. The conflicting rule instances are chosen such that if all those instances are present in the conflict set and the arithmetic predicate holds, one or more of the instances must be redacted. The RHS of a redaction rule consists of the specification of those instances that must be redacted from the conflict set.

Although the procedures and components listed above represent an embodiment of the present invention, it will be appreciated by those skilled in the art that many modifications could be made to the procedures and components without modifying from the spirit of the present invention For instance, the procedures could be modified for implementation in other rule-based languages. In addition, the state record could be modified and maintained in a number of different ways to provide the same basic function of producing a fact chain without the need for a dependency graph.

We claim:

1. A method for using a computer to produce at least one inferential information item from at least one given information item,
    comprising producing a first set of information items,
        producing said first set of information items comprising a plurality of cycles, each of said cycles comprising at least one step of applying a rule of inference to an information item, thereby producing said first set of information items at a cycle here called present cycle, and
    further comprising, at said present cycle, an additional step of modifying said first set of information items to produce a second set of information items upon receipt of at least one additional information item, said additional step comprising:
        initializing a status record for each one of the at least one additional information item, indicating its presence at said present cycle and its absence at cycles preceding said present cycle,
        updating, for each one of the first set of information items, a status record indicating (i) its presence or absence for each one of said plurality of cycles, presence or absence being determined based on respective inferential compatibility or incompatibility with said at least one additional information item, (ii) the number of times it has been added, and (iii) the number of times it has been deleted.

2. The method of claim 1, being performed by a first processor, wherein said step of modifying comprises producing said at least one additional information item by a second processor operating in parallel with said first processor.

3. The method of claim 1, further comprising an additional step of
    resolving conflicts in said first set of information items upon application of at least one conflict-resolution rule, here called meta redaction rule, to produce a second set of information items from said first set of information items which are not in conflict according to said at least one meta redaction rule,
    said at least one meta redaction rule being included with said at least one rule of inference.

4. The method of claim 3, said additional step being included with each cycle of said plurality of cycles.

5. A knowledge-based system comprising means for producing at least one inferential information item from at least one given information item, said knowledge-based system comprising:
    processing means for performing a plurality of cycles comprising at least one step of applying a rule of inference to an information item to produce, at a cycle here called present cycle, a first set of information items, modifying means for modifying, at said present cycle, said first set of information items to produce a second set of information items upon receipt of at least one additional information item, said modifying means comprising:

means for initializing a status record for each one of the at least one additional information item, indicating its presence at said present cycle and its absence at cycles preceding said present cycle, and means for updating, for each one of the first set of information items, a status record indicating (i) its presence or absence for each one of said plurality of cycles, presence or absence being determined based on respective inferential compatibility or incompatibility with said at least one additional information item, (ii) the number of times it has been added, and (iii) the number of times it has been deleted.

6. The knowledge-based system of claim 5, wherein said processing means comprises a plurality of processors adapted to operate in parallel, at least one of said plurality of processors being adapted to receive said at least one additional information item from another one of said plurality of processors.

7. The knowledge-based system of claim 6, wherein said plurality of processors operate in an asynchronous manner and said modifying means is coupled to each one of said plurality of processors.

8. The knowledge-based system of claim 5, further comprising conflict resolution means coupled to said processing means for removing conflicting rule inferences from ones of said at least one rule of inference so as to avoid inference conflicts within said first set of information items.

* * * * *

UNITED STATES PATENT AND TRADEMARK OFFICE
CERTIFICATE OF CORRECTION

PATENT NO. : 5,363,473

DATED : November 8, 1994

INVENTOR(S) : Salvatore J. Stolfo et al.

It is certified that error appears in the above-identified patent and that said Letters Patent is hereby corrected as shown below:

Col. 7, line 16, "NEW" should read -- ¬NEW --.  Col. 9, line 8, "$f_1, f_2$" should read -- $\neg f_1, f_2$ --.  Col. 10, line 24, "DATALOG¬" should read -- DATALOG --.  Col. 11, line 2, "pj" should read -- $P_j$ --; line 40, "processor $P_i$" should read -- processor $p_i$ --.  Col. 12, line 24, "$P_i$" should read -- $p_i$ --; line 27, "$P_i$" should read -- $p_i$ --; line 35, "$P_i$" should read -- $p_i$ --.

Signed and Sealed this

Seventh Day of February, 1995

Attest:

BRUCE LEHMAN

*Attesting Officer*  *Commissioner of Patents and Trademarks*